(12) United States Patent
Shimizu

(10) Patent No.: US 11,696,005 B2
(45) Date of Patent: Jul. 4, 2023

(54) IMAGING APPARATUS, AND MOVING OBJECT

(71) Applicant: CANON KABUSHIKI KAISHA, Tokyo (JP)

(72) Inventor: Yoko Shimizu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 123 days.

(21) Appl. No.: 17/072,818

(22) Filed: Oct. 16, 2020

(65) Prior Publication Data

US 2021/0127044 A1  Apr. 29, 2021

(30) Foreign Application Priority Data

Oct. 23, 2019 (JP) .................................. 2019-192826

(51) Int. Cl.
| | | |
|---|---|---|
| *H04N 23/52* | (2023.01) | |
| *G02B 7/00* | (2021.01) | |
| *B61K 9/08* | (2006.01) | |
| *B61L 23/04* | (2006.01) | |
| *H04N 23/54* | (2023.01) | |

(52) U.S. Cl.
CPC .............. *H04N 23/52* (2023.01); *B61K 9/08* (2013.01); *B61L 23/042* (2013.01); *G02B 7/008* (2013.01); *H04N 23/54* (2023.01)

(58) Field of Classification Search
CPC .... H04N 5/22521; H04N 5/2253; B61K 9/08; B61L 23/042; G02B 7/008
See application file for complete search history.

(56) References Cited

U.S. PATENT DOCUMENTS

| | | | | |
|---|---|---|---|---|
| 10,098,267 B1* | 10/2018 | Janson | ................. | H05K 9/0035 |
| 11,014,481 B2* | 5/2021 | Tait | ......................... | B60R 11/02 |
| 11,076,099 B1* | 7/2021 | Xu | ..................... | H04N 5/23258 |
| 2004/0263624 A1* | 12/2004 | Nejikovsky | ........... | B61L 23/042 |
| | | | | 348/148 |
| 2010/0195865 A1* | 8/2010 | Luff | ..................... | G06V 10/421 |
| | | | | 382/100 |
| 2012/0050981 A1* | 3/2012 | Xu | ..................... | H05K 7/20727 |
| | | | | 361/679.33 |
| 2013/0148016 A1* | 6/2013 | Oh | ....................... | H04N 5/2253 |
| | | | | 348/E5.026 |
| 2014/0168507 A1* | 6/2014 | Renaud | ................ | H04N 5/2253 |
| | | | | 348/373 |

(Continued)

FOREIGN PATENT DOCUMENTS

JP  2019-84955 A  6/2019

*Primary Examiner* — Joseph Suh
(74) *Attorney, Agent, or Firm* — Canon U.S.A., Inc., IP Division

(57) ABSTRACT

An imaging apparatus is mounted on a moving object and configured to capture an image while moving along a moving direction of the moving object. The imaging apparatus includes a sensor unit including a sensor substrate on which an image sensor is mounted, and a main unit including a main substrate on which an electronic component configured to process an output signal from the sensor substrate is mounted. The imaging apparatus further includes a heat dissipation fin configured to dissipate heat generated in at least one of the sensor unit and the main unit. The heat dissipation fin is provided in a direction substantially parallel to the moving direction.

22 Claims, 11 Drawing Sheets

(56) References Cited

U.S. PATENT DOCUMENTS

| | | | |
|---|---|---|---|
| 2015/0035131 A1* | 2/2015 | Ko | H01L 23/16 |
| | | | 257/690 |
| 2015/0042798 A1* | 2/2015 | Takeda | H04N 5/2252 |
| | | | 348/148 |
| 2016/0200161 A1* | 7/2016 | Van Den Bossche | G01S 17/89 |
| | | | 250/206 |
| 2018/0151919 A1* | 5/2018 | Sasaki | H01M 10/44 |
| 2018/0200552 A1* | 7/2018 | Wertsberger | A62C 37/40 |
| 2018/0301242 A1* | 10/2018 | Sugino | H02G 1/08 |
| 2018/0319022 A1* | 11/2018 | Yoshimura | B25J 17/0241 |
| 2019/0064001 A1* | 2/2019 | Valdez | G01K 1/024 |
| 2019/0279481 A1* | 9/2019 | Silberschatz | G08B 21/0208 |
| 2019/0320159 A1* | 10/2019 | Ishii | G03B 17/02 |
| 2019/0353989 A1* | 11/2019 | Kesavamatham | G03B 17/561 |
| 2020/0049938 A1* | 2/2020 | Tseng | G02B 7/021 |
| 2020/0186707 A1* | 6/2020 | Mallet | G06Q 50/18 |
| 2020/0231076 A1* | 7/2020 | Kapolnek | B60R 16/03 |
| 2020/0412042 A1* | 12/2020 | Zhao | H01R 12/722 |
| 2021/0094480 A1* | 4/2021 | Zhang | H04N 7/18 |
| 2021/0178994 A1* | 6/2021 | Nakai | B60R 16/0207 |

\* cited by examiner

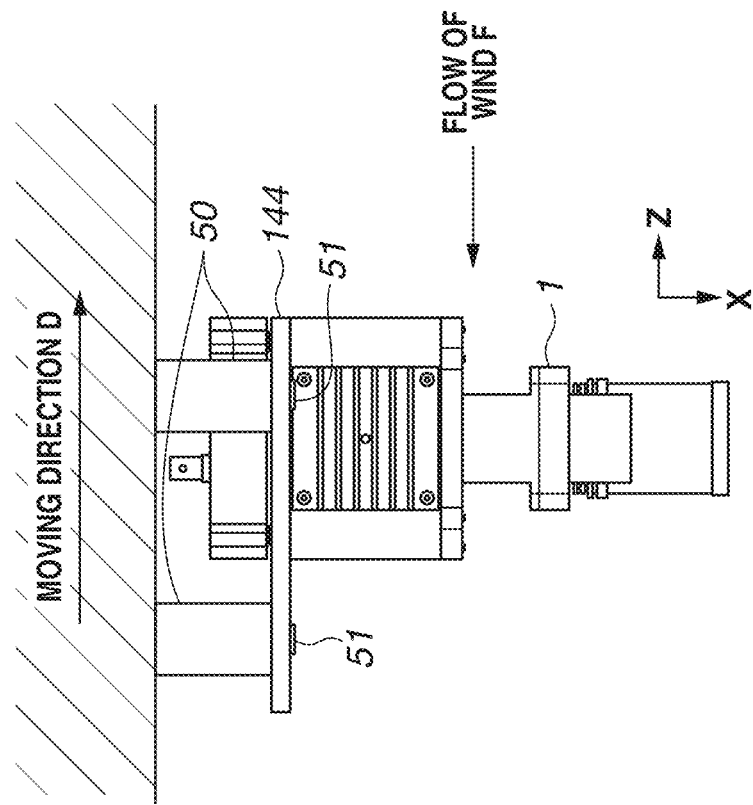
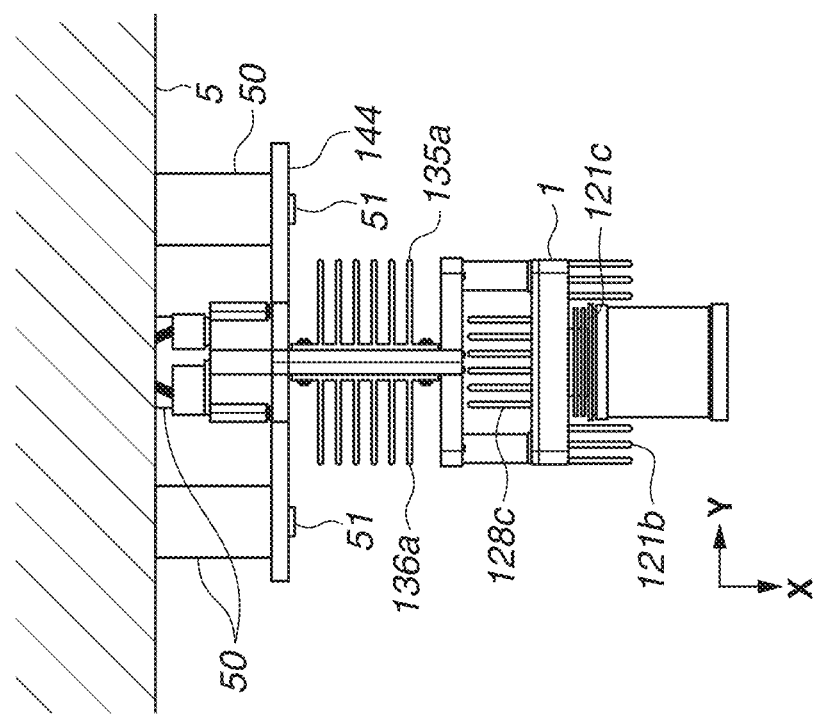

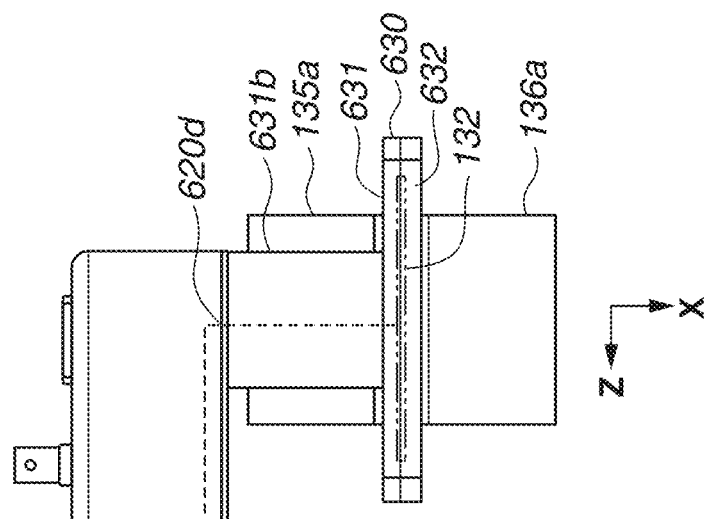
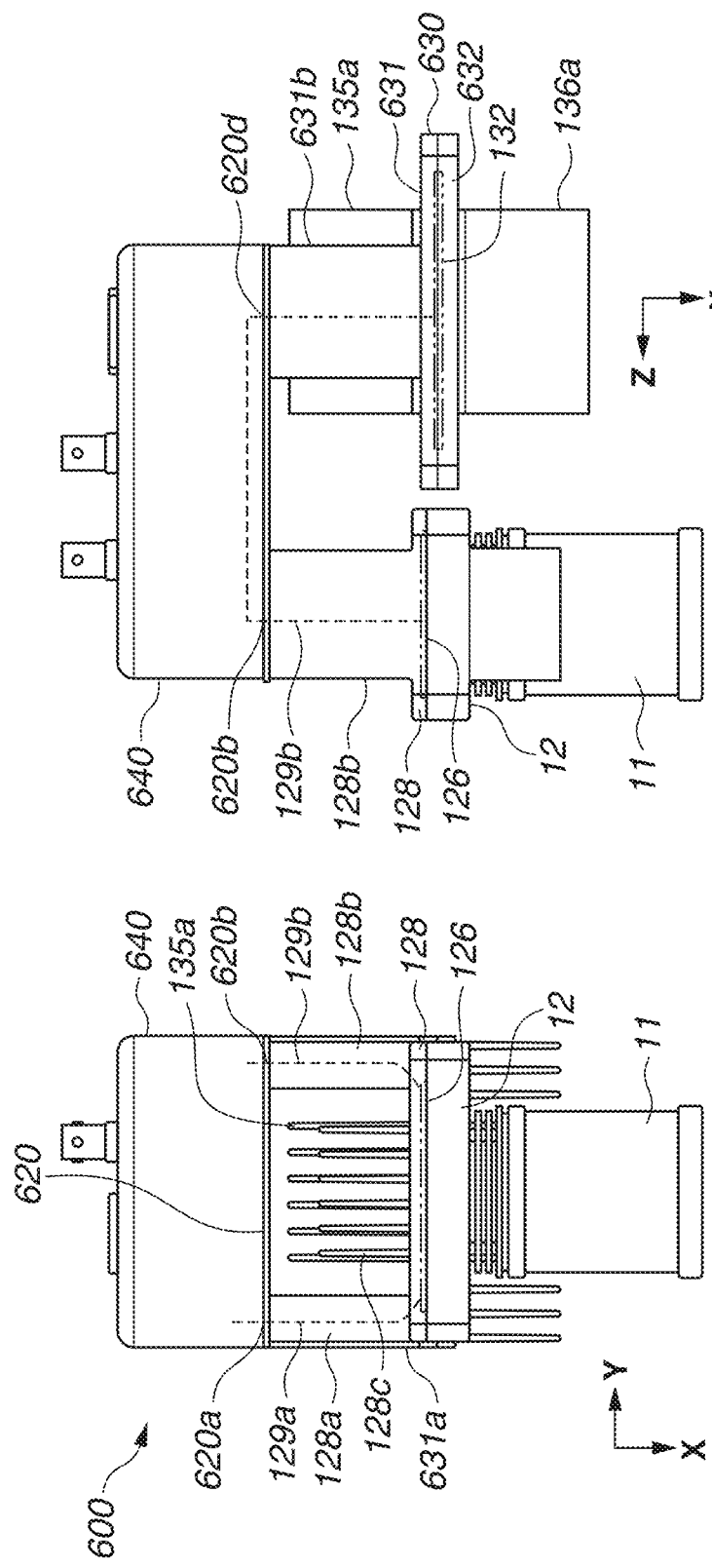

IMAGING APPARATUS, AND MOVING OBJECT

BACKGROUND

Field of the Disclosure

The present disclosure generally relates to an imaging apparatus, and, in particular, to an imaging apparatus that dissipates heat using a heat dissipation fin.

Description of the Related Art

There is known a technique that detects a state of a target using an image captured by an imaging apparatus. Japanese Patent Application Laid-Open No. 2019-84955 discusses a technique that detects an abnormality in a railway track using an image captured by a camera mounted on a moving train.

However, images should be captured at a high frame rate to detect the state of the target such as the railway track accurately, but continuously capturing the images at the high frame rate causes an increase in the temperature of the camera itself, thereby raising a possibility of undesirably adversely affecting the detection accuracy.

Conventional countermeasures against heat for imaging apparatuses include methods using, for example, a fan, a duct, a Peltier device, and a heat pipe. However, these methods may necessitate the replacement of the device used to dissipate the heat because of its lifespan or due to a malfunction thereof, thereby undesirably impairing the maintainability of the entire apparatus. Further, these methods may also undesirably lead to an increase in the size of the apparatus, thereby also bringing about a problem of making it impossible to set up the apparatus in a limited space.

SUMMARY

The present disclosure generally describes an imaging apparatus small in size and not impairing the maintainability.

According to an aspect of the present disclosure, an imaging apparatus mounted on a moving object and configured to capture an image while moving along a moving direction of the moving object, includes a sensor unit including a sensor substrate on which an image sensor is mounted, a main unit including a main substrate on which an electronic component configured to process an output signal from the sensor substrate is mounted, and a heat dissipation fin configured to dissipate heat generated in at least one of the sensor unit and the main unit, wherein the heat dissipation fin is provided in a direction substantially parallel to the moving direction.

Further features of the present disclosure will become apparent from the following description of exemplary embodiments with reference to the attached drawings.

BRIEF DESCRIPTION OF THE DRAWINGS

FIGS. 5A and 5B illustrate how the camera according to the first exemplary embodiment is mounted on a train.

FIGS. 11A and 11B illustrate an outer appearance of a camera according to a fifth exemplary embodiment.

DESCRIPTION OF THE EMBODIMENTS

In the following description, representative exemplary embodiments of the present disclosure will be described in detail with reference to the attached drawings.

Figure 1:
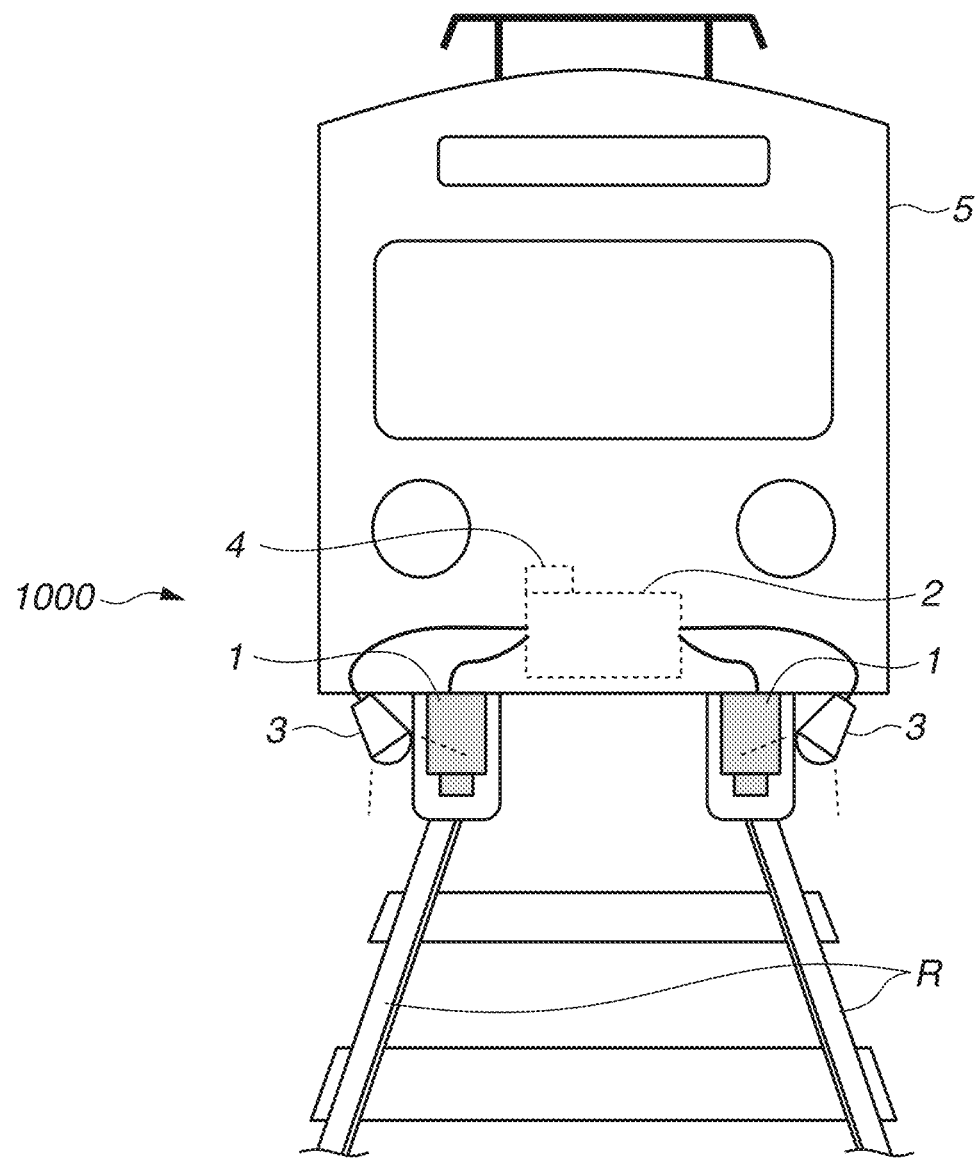
FIG. 1 schematically illustrates a railway track inspection system according to a first exemplary embodiment disclosure.

FIG. 1 schematically illustrates a railway track inspection system according to a first exemplary embodiment. A railway track inspection system 1000 is an apparatus for inspecting whether there is an abnormality in a railway track R. The present exemplary embodiment will be described regarding the railway track inspection system, but the present disclosure shall not be limited to the railway track inspection system. The present disclosure can be applied to a system that captures an image with a camera mounted on a moving object, such as a system that inspects damage or wear of a pantograph or a system for checking a state of an iron bridge or a tunnel with a camera mounted on an upper portion of a train, a system that images a situation on a highway with a camera mounted on an automobile.

As illustrated in FIG. 1, the railway track inspection system 1000 includes a plurality of cameras 1, a plurality of illumination units 3, an inspection unit 2, and a Global Navigation Satellite System (GNSS) unit 4. The plurality of cameras 1 is cameras capable of capturing images at a high speed of a frame rate of 120 frames per second (fps) or more, and is mounted so as to be able to image the railway track R from a plurality of directions from a bottom surface portion of a train 5 and is configured in such a manner that, for example, a left rail, a right rail, and a central sleeper are contained in the angles of view of respective cameras. The train 5 is, for example, a railway vehicle that runs at a maximum speed from approximately 80 to 120 kilometers per hour. Assume that, in the railway track inspection system 1000 according to the present exemplary embodiment, the image qualities of the images captured by the plurality of cameras 1 are stabilized while the train 5 is running. Further, the plurality of illumination units 3 illuminates a subject image at a high luminance when the cameras 1 image the subject at the high speed image-capturing. Further, the inspection unit 2 is set up inside the vehicle body of the train 5, and includes an information processing unit 200 that detects an abnormality in the railway track R based on the plurality of images captured by the plurality of cameras 1. The GNSS unit 4 is a unit that receives a navigational signal transmitted from an artificial satellite and measures the position of this apparatus itself on the earth.

The plurality of cameras 1, the plurality of illumination units 3, and the GNSS unit 4 are electrically connected to the inspection unit 2, and the plurality of cameras 1 outputs the plurality of captured images to the inspection unit 2 as video signals as will be described below. FIG. 1 illustrates two cameras 1 by way of example, but the number of cameras 1 may be one or three or more in the present exemplary embodiment. The cameras 1 image the railway track R, which is a rail of a track, and the imagining directions thereof extend substantially perpendicularly to a moving direction of the train 5.

Figure 2:
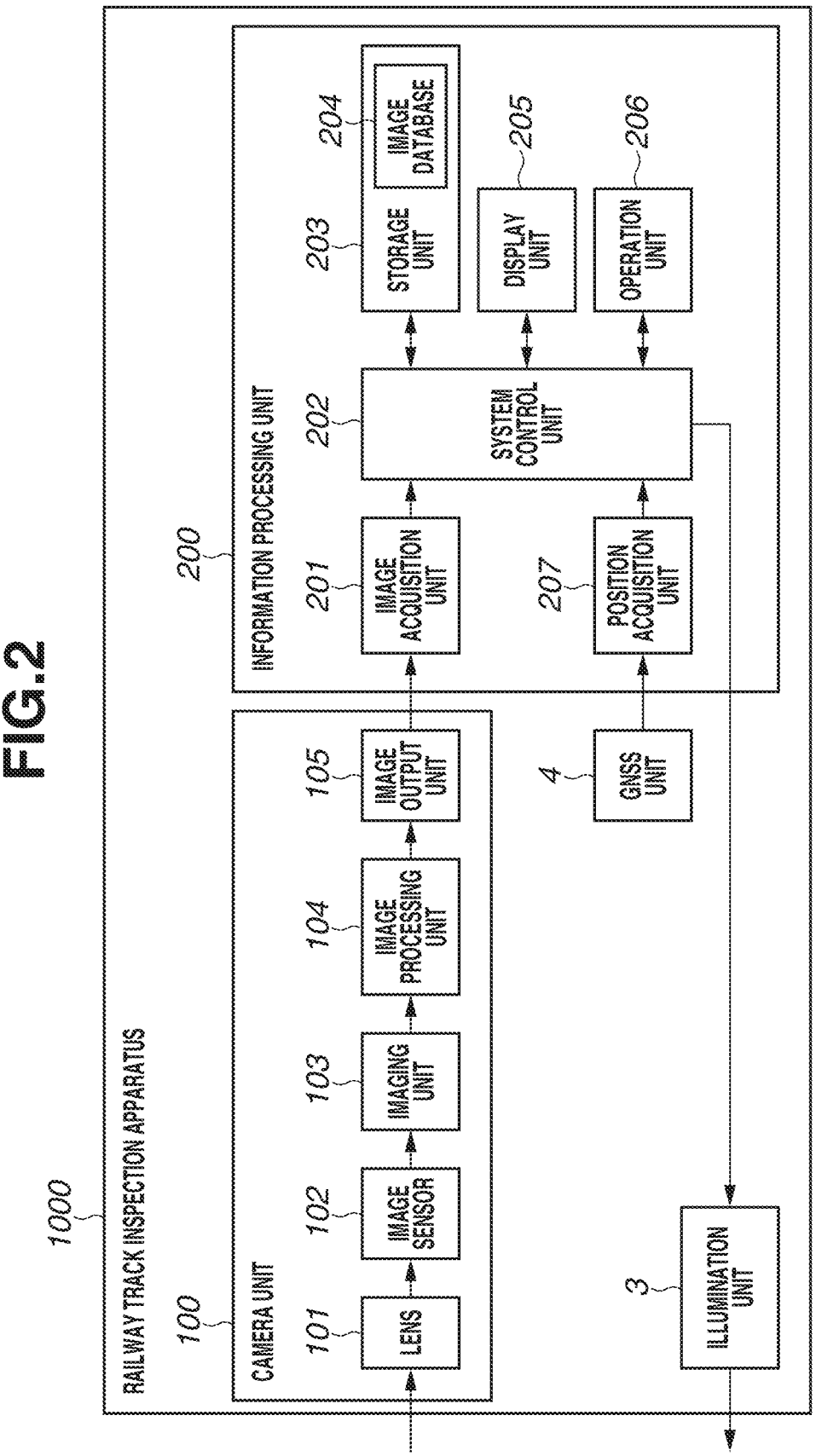
FIG. 2 is a block diagram illustrating a configuration of the railway track inspection system according to the first exemplary embodiment.

Next, the configuration of the railway track inspection system 1000 will be described. FIG. 2 is a block diagram illustrating a configuration of the railway track inspection system 1000 according to the present exemplary embodiment. The railway track inspection system 1000 includes a camera unit 100, which is an internal system of the camera 1, the information processing unit 200, which is an internal system of the inspection unit 2, the illumination unit 3, and the GNSS unit 4. As illustrated in FIG. 2, the camera unit 100 includes a lens 101, an image sensor 102, an imaging unit 103, an image processing unit 104, and an image output unit 105. Subject light transmitted through the lens 101 is imaged on a light receiving surface of the image sensor 102, and the formed optical image is input to the imaging unit 103. The imaging unit 103 photoelectrically converts the input optical image and generates an analog video signal. Further, the imaging unit 103 converts the analog signal into a digital signal and outputs the digital signal to the image processing unit 104. The image processing unit 104 converts the input digital signal into an image file for outputting it to the information processing unit 200. The image output unit 105 includes an external interface such as Universal Serial Bus (USB) and High-Definition Multimedia Interface (HDMI®), and outputs the image file generated by the image processing unit 104 to the information processing unit 200.

The information processing unit 200 includes an image acquisition unit 201, a system control unit 202, a storage unit 203, an image database 204 provided in the storage unit 203, a display unit 205, an operation unit 206, and a position acquisition unit 207. The image acquisition unit 201 includes an external interface such as USB and HDMI, and acquires the plurality of images output from the plurality of cameras 1. The system control unit 202 controls, based on the images acquired by the image acquisition unit 201, an operation of each of the units in the information processing unit 200 by performing processing according to a program stored in the storage unit 203. The position acquisition unit 207 acquires positional information from the GNSS unit 4. The storage unit 203 stores the image data acquired from the image acquisition unit 201 and the positional information acquired from the position acquisition unit 207 together. Further, a database for reading out and searching for the image data and the positional information is stored in the image database 204. The display unit 205 is a liquid-crystal display, an organic electro luminescence (EL) display, or the like, and displays an image thereon. The operation unit 206 includes a touch panel, a pressing button, a slide switch, and/or the like, and receives an input operation of a user.

The user operates the operation unit 206 while viewing the acquired image data with the positional information attached thereto using the operation unit 206, thereby reading out previous image data having the same positional information from the storage unit 203 from the data stored in the image database 204 and causing it to be displayed on the display unit 205. The user compares both of the pieces of image data and checks the presence or absence of a change in the state of the railway track R. The change in the state of the railway track R refers to, for example, whether the railway track R is not cracked, whether the rail end portion or intermediate portion is not deformed, and whether an electric conductor electrically connecting rails adjacent to each other is not deteriorated. If finding out an abnormality by comparing the images, the user identifies a track maintenance portion based on the positional information of this image and carries out track maintenance work.

Alternatively, a not-illustrated detection unit is provided to the railway track inspection system 1000, and the detection unit reads out the previous image data having the same positional information from the storage unit 203 from the data stored in the image database 204. The detection unit automatically compares the images with respect to predetermined data read out from the image database 204 and the output signal from the image output unit 105, and checks the presence or absence of a change in the state of the detection target. The detection target in this case is the above-described railway track R.

Next, the camera 1 of the railway track inspection system 1000 will be described.

Figure 3:
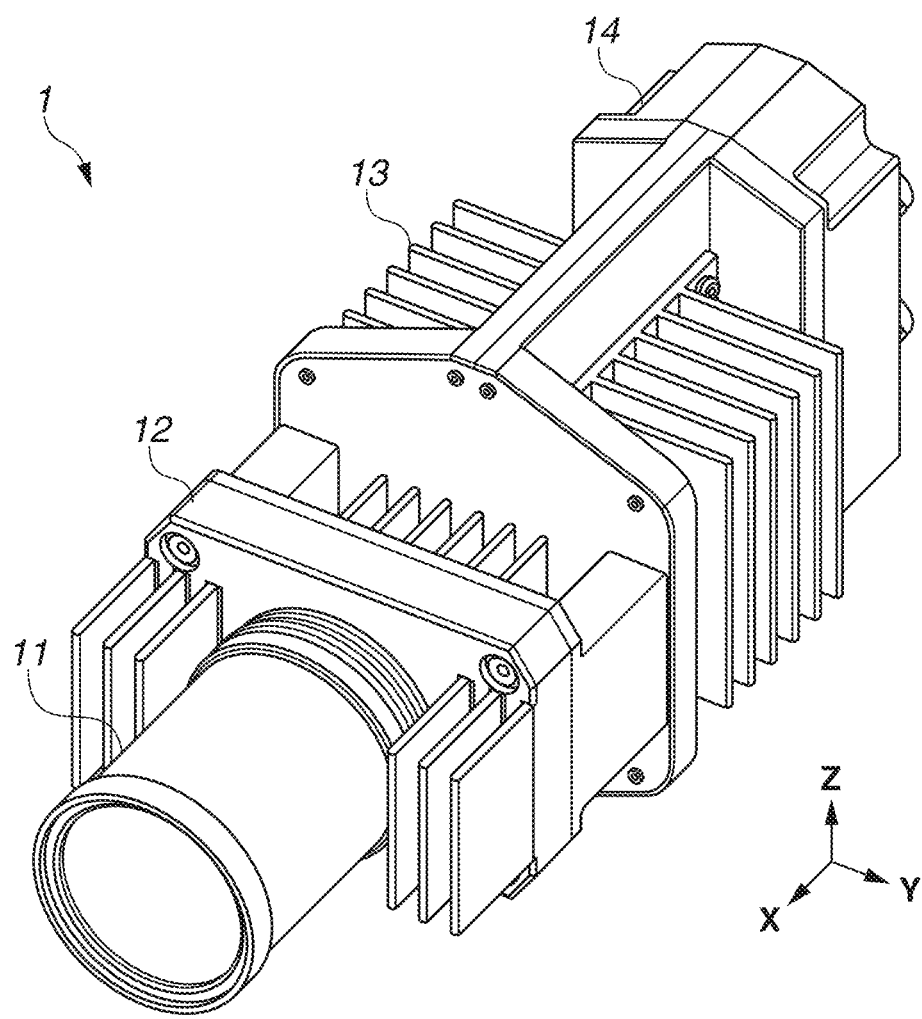
FIG. 3 illustrates a perspective view of an outer appearance of a camera according to the first exemplary embodiment.

FIG. 3 illustrates a perspective view of the outer appearance of the camera 1 according to the present exemplary embodiment. In the following description, a front side and a back side will refer to the lens unit 11 side of the camera 1 and an opposite side thereof, respectively.

Further, as illustrated in FIG. 3, three-dimensional coordinates are set with the camera 1 as a reference, and X, Y, and Z-axis directions in the drawings correspond to longitudinal, lateral, and vertical directions, respectively. These lateral direction and vertical direction refer to the lateral direction and the vertical direction when the camera 1 is viewed from the front side. More specifically, an X-axis positive direction and an X-axis negative direction are defined to be a direction extending from the camera 1 toward the subject side and an opposite direction thereof in the direction of the optical axis of the optical system of the lens unit 11 in the camera 1, respectively. Further, a Y-axis positive direction and a Y-axis negative direction are defined to be a direction perpendicular to the X axis and extending toward the right side when the camera 1 is viewed from the front side, and an opposite direction thereof, respectively. Further, a Z-axis positive direction and a Z-axis negative direction are defined to be a direction perpendicular to the X axis and Y axis and extending toward the upper side when the camera 1 is viewed from the front side, and an opposite direction thereof, respectively. On the camera 1, a front surface, a back surface, a right side surface, a left side surface, a top surface, and a bottom surface are defined to be surfaces thereof in the X-axis positive direction, the X-axis negative direction, the Y-axis positive direction, the Y-axis negative direction, the Z-axis positive direction, and the Z-axis negative direction, respectively.

As illustrated in FIG. 3, the camera 1 mainly includes the lens unit 11, the sensor unit 12, the main unit 13, and the interface unit 14. In the following description, the details of each of the components will be described.

Figure 4:
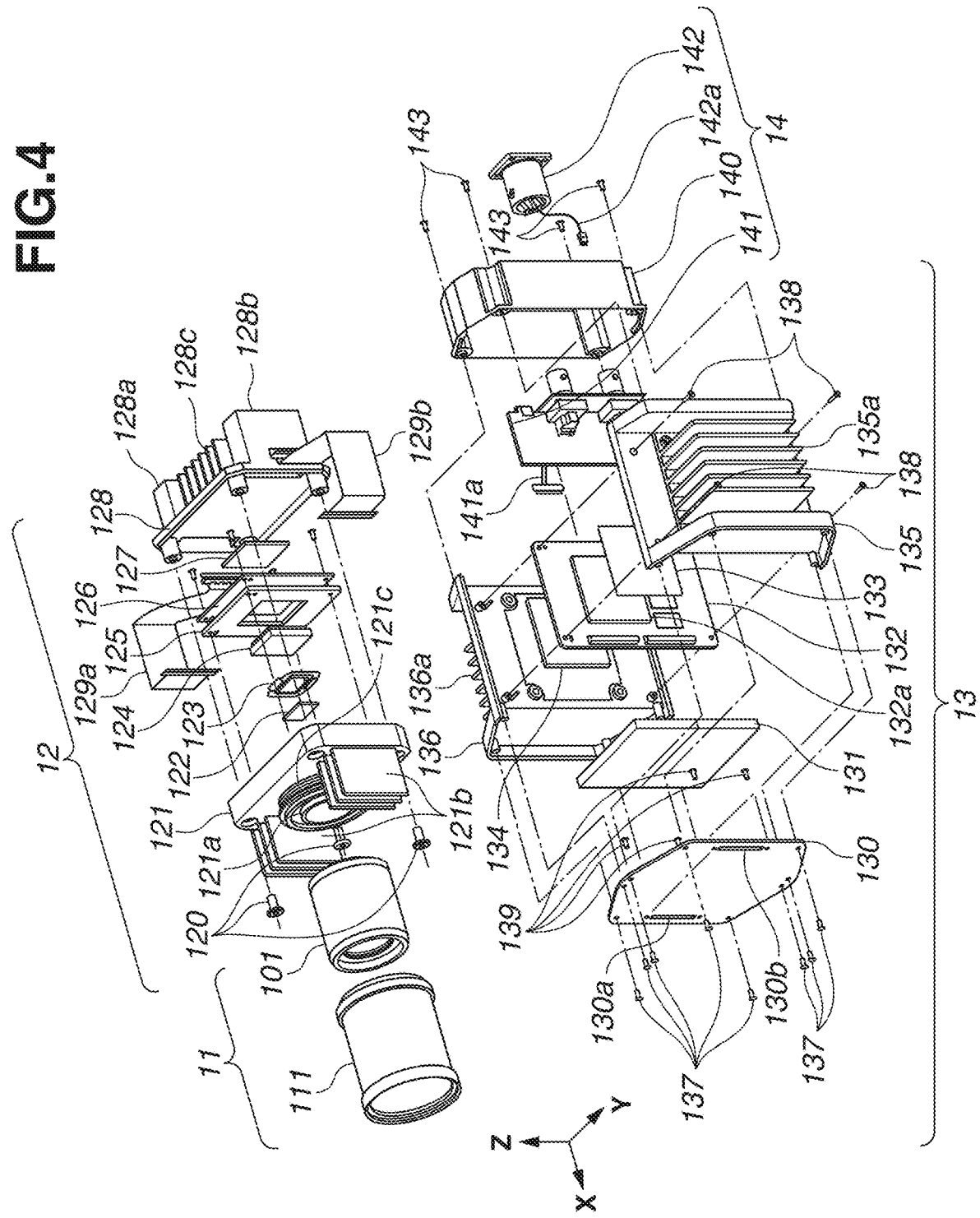
FIG. 4 illustrates an exploded perspective view of main components of the camera according to the first exemplary embodiment.

FIG. 4 illustrates an exploded perspective view of main components of the camera 1 according to the present exemplary embodiment. FIG. 4 illustrates the lens unit 11 including the lens 101 in the optical system and a protection cover 111. The lens 101 is a lens having a focal length that allows the lens 101 to be focused on the railway track R in the camera 1 mounted on the bottom surface portion of the train 5. The protection cover 111 is a cover that covers the side surfaces and the front surface of the lens 101, and protects the lens 101 from dust and a water droplet from the outside. Lens mount portions are formed at the back portions of the lens 101 and the protection cover 111, and are each fixed to a mount portion 121a provided to the sensor unit 12 by a mounting method such as a screw-in method.

Further, FIG. 4 illustrates the sensor unit 12. The sensor unit 12 includes screws 120, a front cover 121, a low-pass filter 122, a sensor mask 123, an image sensor 124, a sensor plate 125, a sensor substrate 126, a heat transfer member 127, a heat sink cover 128, and connection wires 129. The connection wires 129 include a connection wire 129a and a connection wire 129b. The front cover 121 and the heat sink cover 128 are exterior members made from highly thermally conductive materials such as die-cast aluminum. As illustrated in FIG. 4, some components of the sensor unit 12 are disposed inside the front cover 121 and the heat sink cover 128. The front cover 121 and the heat sink cover 128 are sealed on the front and back sides using the screws 120.

The image sensor 124 is an image sensor such as a charge coupled device (CCD) sensor and a complementary metal-oxide semiconductor (CMOS) sensor, and generates heat with an image of the light incident from the lens 101 formed thereon. The low-pass filter 122 is an optical member that reduces moire and false color. The sensor mask 123 is a mask member for blocking light other than the light incident on the lens 101 to allow only an effective light flux to enter the image sensor 124 while sealing between the image sensor 124 and the low-pass filter 122. The image sensor 124 is mounted on the sensor substrate 126 while being electrically connected thereto, and an analog/digital (A/D) conversion circuit that converts an analog signal output from the image sensor 124 into a digital signal, and the like are mounted on the sensor substrate 126. Heat is generated from the electric components executing such operations. The sensor plate 125 is made from a highly thermally conductive material such as copper and aluminum, and is disposed between the front cover 121 and the sensor substrate 126 to transfer the heat generated in the image sensor 124 and the sensor substrate 126 to the front cover 121. The heat transfer member 127 is a thermally conductive material such as heat dissipation rubber, and is connected so as to be able to conduct the heat by being sandwiched in a compressed state between the back surface of the sensor substrate 126 and the heat sink cover 128. The connection wires 129a and 129b are flexible, and electrically connect the sensor substrate 126 and the main substrate 132 provided in the main unit 13 to each other. How the connection wires 129a and 129b are connected will be described below. Heat dissipation fins 121b are provided on a surface of the front cover 121 on the lens 101 side (surface in the X-axis positive direction) in a protruding manner on both sides of the mount portion 121a in a direction perpendicular to the sensor substrate 126 while being exposed to outside the casing. Further, heat dissipation fins 128c are provided at the central portion of a surface of the heat sink cover 128 on the opposite side of the lens 101 (surface in the X-axis negative direction) in a manner protruding in a direction perpendicular to the sensor substrate 126 while being exposed to outside the casing. The heat dissipation fins 121b and 128c are each a plurality of substantially rectangular fins provided in the protruding manner at equal intervals. The heat dissipation fins 121b and the heat dissipation fins 128c diffuse the heat transferred from the sensor plate 125 to the front cover 121 and the heat transferred from the sensor substrate 126 via the heat transfer member 127, respectively, and dissipate the heat into the outside air with the aid of natural heat dissipation. Further, circular fins 121c are formed around the mount portion 121a of the front cover 121, and transfer the heat of the air around the image sensor 124 and dissipate the heat to the outside air with the aid of natural heat dissipation. The heat dissipation fins 121b and 128c are not limited to the structures integrally molded on the front cover 121 and the heat sink cover 128, and heat dissipation fins prepared as different members may be attached to the exterior covers.

Further, FIG. 4 illustrates the main unit 13 including a heat insulation plate 130, a heat insulation member 131, the main substrate 132 on which an electronic component 132a is mounted, heat transfer members 133 and 134, a right-side cover 135, a left-side cover 136, and screws 137 to 139. The heat insulation plate 130, which is located on facing surfaces of the sensor substrate 126 and the main substrate 132, is made from a low thermally conductive material such as a stainless plate, and is configured to connect the sensor unit 12 and the main unit 13 to each other using the screws 139 yet prevent the heat of them from being transferred to each other. Hole portions 130a and 130b are formed on the heat insulation plate 130, and the connection wires 129a and 129b, which will be described below, are inserted through the hole portions 130a and 130b. The heat insulation member 131 is a heat insulation member made from glass wool, urethane foam, or the like, and insulates the main unit 13 and the sensor unit 12 from heat by being attached to the heat insulation plate 130 using an adhesive tape or the like. The main substrate 132 is electrically connected to the sensor substrate 126 via the connection wires 129a and 129b, and performs image processing for converting the signal output from the sensor substrate 126 into the image file using the electronic component 132a mounted thereon. The electronic component 132a generates heat when performing the above-described processing. The heat transfer member 133 is a thermally conductive material such as heat dissipation rubber, and transfers the heat generated in the electronic component 132a to the right-side cover 135 by being sandwiched in a compressed state between the electronic component 132a and the right-side cover 135. The heat transfer member 134 is also a thermally conductive material such as heat dissipation rubber like the heat transfer member 133, and is sandwiched in a compressed state between a surface of the main substrate 132 in the Y-axis negative direction and the left-side cover 136. With this arrangement, the heat transfer member 134 transfers, to the left-side cover 136, heat in the main substrate 132 to which the heat of the electronic component 132a is diffused. The right-side cover 135 and the left-side cover 136 are exterior members formed from highly thermally conductive materials such as die-cast aluminum, and are disposed so as to face the main substrate 132 and are sealed in the lateral direction using the screws 138. Heat dissipation fins 135a are provided on a surface of the right-side cover 135 on the exterior side (Y-axis positive direction) in a manner protruding in a direction perpendicular to the main substrate 132 while being exposed to outside the casing. Heat dissipation fins 136a are provided on a surface of the left-side cover 136 on the exterior side (Y-axis negative direction) in a manner protruding in a direction perpendicular to the main substrate 132 while being exposed to outside the casing. The heat dissipation fins 135a and 136a are each a plurality of substantially rectangular fins provided in the protruding manner at equal intervals. The heat dissipation fins 135a diffuse the heat transferred from the electronic component 132a via the heat transfer member 133, and dissipate the heat into the outside air with the aid of natural heat dissipation. The heat dissipation fins 136a diffuse the heat transferred from the main substrate 132 via the heat transfer member 134, and dissipate the heat into the outside air with the aid of natural heat dissipation. The heat dissipation fins 135a and 136a are not limited to the structures integrally molded on the right-side cover 135 and the left-side cover 136, and heat dissipation fins prepared as different members may be attached to the exterior covers.

Further, FIG. 4 illustrates the interface unit 14 including a rear cover 140, an interface substrate 141, a power source connector 142, and screws 143. The rear cover 140 includes an opening portion for inserting an external interface such as a USB connector and/or a Bayonet Neill-Concelman (BNC) connector and the power source connector 142 mounted on the interface substrate 141, and is fixed to the right-side cover 135 and the left-side cover 136 of the main unit 13 using the screws 143. The interface substrate 141 and the power source connector 142 are electrically connected to the main substrate 132 via connection wires 141a and 142a, respectively.

FIGS. 5A and 5B illustrate how the camera 1 according to the present exemplary embodiment is mounted on the train 5.

FIG. 5A is an enlarged view of a portion where the camera 1 illustrated in FIG. 1 is mounted on the train 5, and is a front view when the train 5 is viewed from the front surface. FIG. 5B is a side view when FIG. 5A is viewed from the left side surface (Y-axis negative direction). FIGS. 5A and 5B illustrate support rods 50 fixed to the train 5, screws 51, and a connection plate 144. The connection plate 144 is attached to the interface unit 14 of the camera 1, and the connection plate 144 is fixed to the support rods 50 using the screws 51. The connection plate 144 may be a plate-shaped member extending from the rear cover 140. Further, the fixing portion fixed to the train 5 is embodied by the connection plate 144 attached to the interface unit 14 in the present exemplary embodiment, but is not limited thereto and may be embodied by, for example, such a structure that a plate-shaped member extending from the front cover 121 of the sensor unit 12 is fixed to the support rods 50. The camera 1 is mounted with the top surface of the camera 1 (Z-axis positive direction) facing in a moving direction D as illustrated in FIG. 5B, and wind F due to a relative motion between the train 5 and the air flows from the top surface side (Z-axis positive direction) to the bottom surface side (Z-axis negative direction) of the camera 1 while the train 5 is running. In this case, nothing blocks the flow of the wind F over each of the heat dissipation fins 121b, 121c, 128c, 135a, and 136a projected in the Z-axis direction as illustrated in FIG. 5A. Mounting the camera 1 on the train 5 in this manner allows the heat to be efficiently dissipated because the wind F flows between the plurality of adjacent fins in each of the heat dissipation fins 121b, 121c, 128c, 135a, and 136a while the train 5 is running. Further, the interface unit 14 does not block the flow of the above-described wind F by being provided on the back surface side of the camera 1. The flow of the wind F is prevented from being blocked by disposing the heat dissipation fins in such a manner that they extend in a direction substantially parallel to the moving direction D of the train 5. The heat dissipation fins 121b and 128c are formed substantially perpendicularly to the sensor substrate 126 and the heat dissipation fins 135a and 136a are formed substantially perpendicularly to the main substrate 132 in the present exemplary embodiment, but the present disclosure is not limited thereto. Further, the individual heat dissipation fins are illustrated as being substantially rectangular, but the present disclosure is not limited thereto.

Figure 6A:
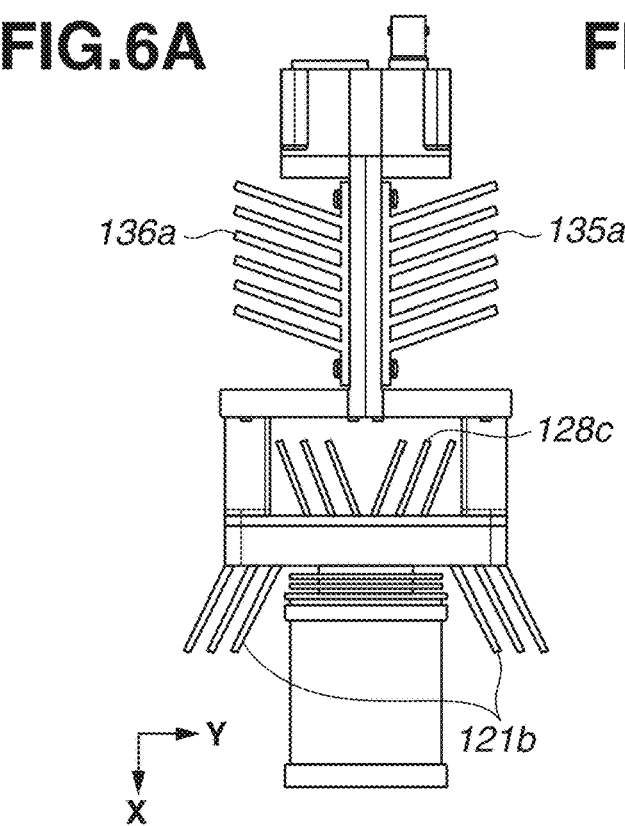
FIGS. 6A, 6B, 6C, and 6D illustrate examples of other forms of heat dissipation fins according to the first exemplary embodiment.
Figure 6B:
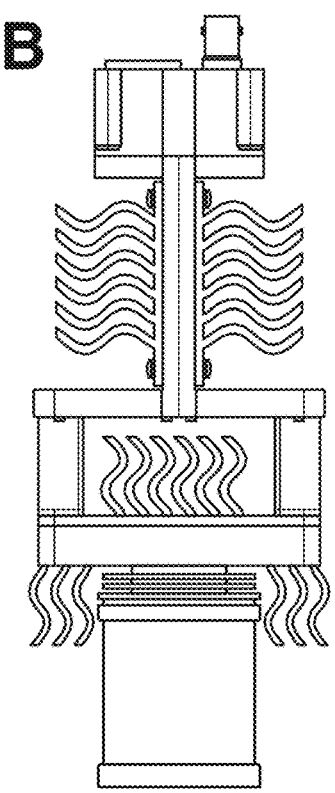
Figure 6C:
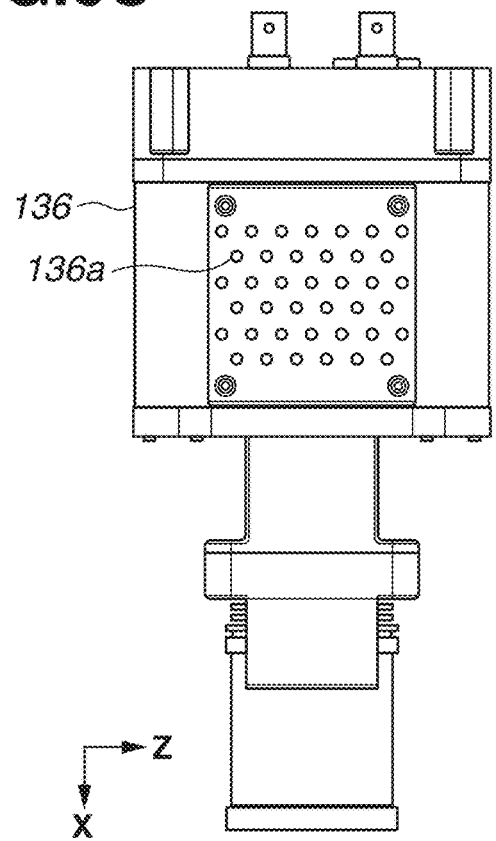
Figure 6D:
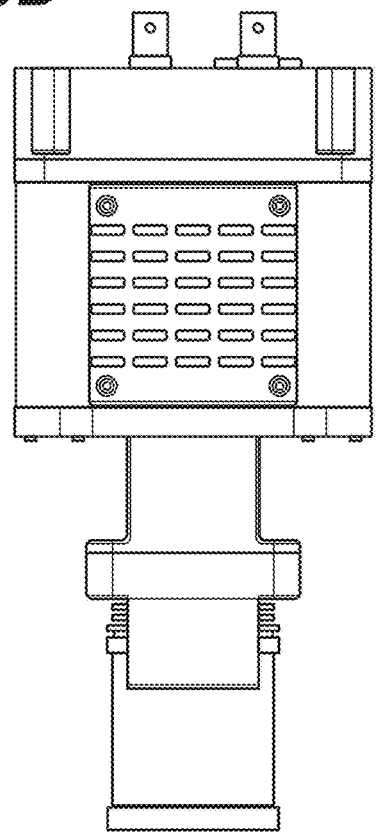

FIGS. 6A, 6B, 6C, and 6D illustrate examples of other forms of the heat dissipation fins according to the present exemplary embodiment. As illustrated in FIGS. 6A and 6B, the heat dissipation fins may be formed so as to be inclined with respect to the sensor substrate 126 and the main substrate 132, or may be formed so as to have S-like shapes. Further, as illustrated in FIGS. 6C and 6D, the shape of each single fin in the heat dissipation unit for use in the heat dissipation is not limited to the rectangle, and these fins may have pin-like shapes or may be rib-shaped fins arranged at equal intervals. The heat dissipation unit may be embodied in any manner as long as it is formed so as to allow the wind F to flow smoothly between the fins.

Next, the connection wires 129a and 129b, which electrically connect the sensor substrate 126 and the main substrate 132 to each other, will be described with reference to FIGS. 7A and 7B.

Figure 7A:
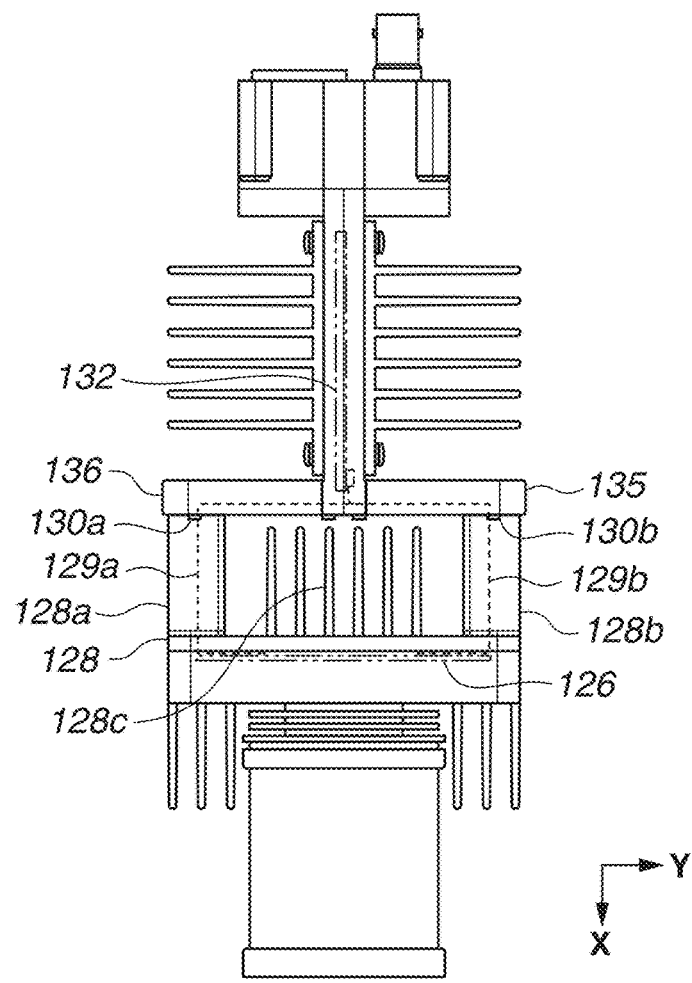
FIGS. 7A and 7B illustrate a connection state between a sensor substrate and a main substrate according to the first exemplary embodiment.
Figure 7B:
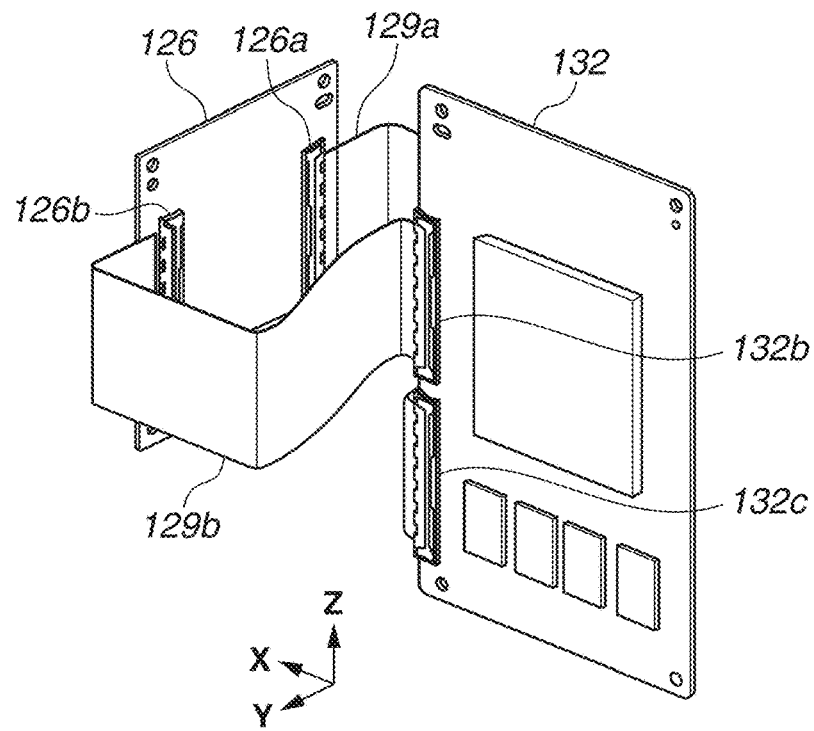

FIGS. 7A and 7B illustrate the connection state between the sensor substrate 126 and the main substrate 132 according to the present exemplary embodiment. FIG. 7A is a top view of the camera 1, and FIG. 7B is a perspective view of main components illustrating how the connection wires 129a and 129b are connected. In FIG. 7A, portions illustrated with dotted lines indicate the connection wires 129a and 129b, and portions illustrated with long dashed double-dotted lines indicate the sensor substrate 126 and the main substrate 132. As illustrated in FIGS. 7A and 7B, the connection wire 129a is connected to a connector 126a mounted on the back surface of the sensor substrate 126 (surface in the X-axis negative direction), passes through inside an arm portion 128a of the heat sink cover 128, is inserted through the hole portion 130a of the heat insulation plate 130, and is then connected to a connector 132c mounted on the main substrate 132. Similarly, the connection wire 129b is connected to a connector 126b mounted on the back surface of the sensor substrate 126, passes through inside an arm portion 128b of the heat sink cover 128, is inserted through the hole portion 130b of the heat insulation plate 130, and is then connected to a connector 132b mounted on the main substrate 132. The arm portions 128a and 128b are provided on the exterior sides of the heat dissipation fins 128c in the Y-axis positive and negative directions, and are arranged so as not to block the flow of the wind F flowing into the heat dissipation fins 128c. Providing the arm portions 128a and 128b and inserting the connection wires 129a and 129b through inside them in this manner allows the sensor substrate 126 and the main substrate 132 to be connected to each other without impeding the heat dissipation from the sensor unit 12 with the aid of the wind F. Further, fixing the arm portions 128a and 128b to the main unit 13 allows the sensor unit 12 and the main unit 13 to be securely fixed to each other.

As described above, according to the present exemplary embodiment, the railway track inspection system 1000 allows the wind F to flow between the fins adjacent to each other in the individual heat dissipation fins provided on the camera 1, thereby being able to efficiently dissipate the heat without use of a forced cooling device such as a fan and a Peltier device while the train 5 is running. The heat dissipation fins can dissipate the heat generated in at least one of the sensor unit 12 and the main unit 13. This allows the camera 1 to capture an image without causing the deterioration of the image quality. Therefore, the present exemplary embodiment can provide a camera not impairing the maintainability and small in size. Further, connecting the sensor unit 12 and the main unit 13 via the arm portions 128a and 128b and the heat insulation plate 130 allows the sensor to be efficiently cooled down without the heat transferred from each other.

In the following description, a second exemplary embodiment will be described with reference to the drawings. The second exemplary embodiment is different from the first exemplary embodiment in terms of the layout of the sensor unit 12, a main unit 330, and an interface unit 340.

Figure 8:
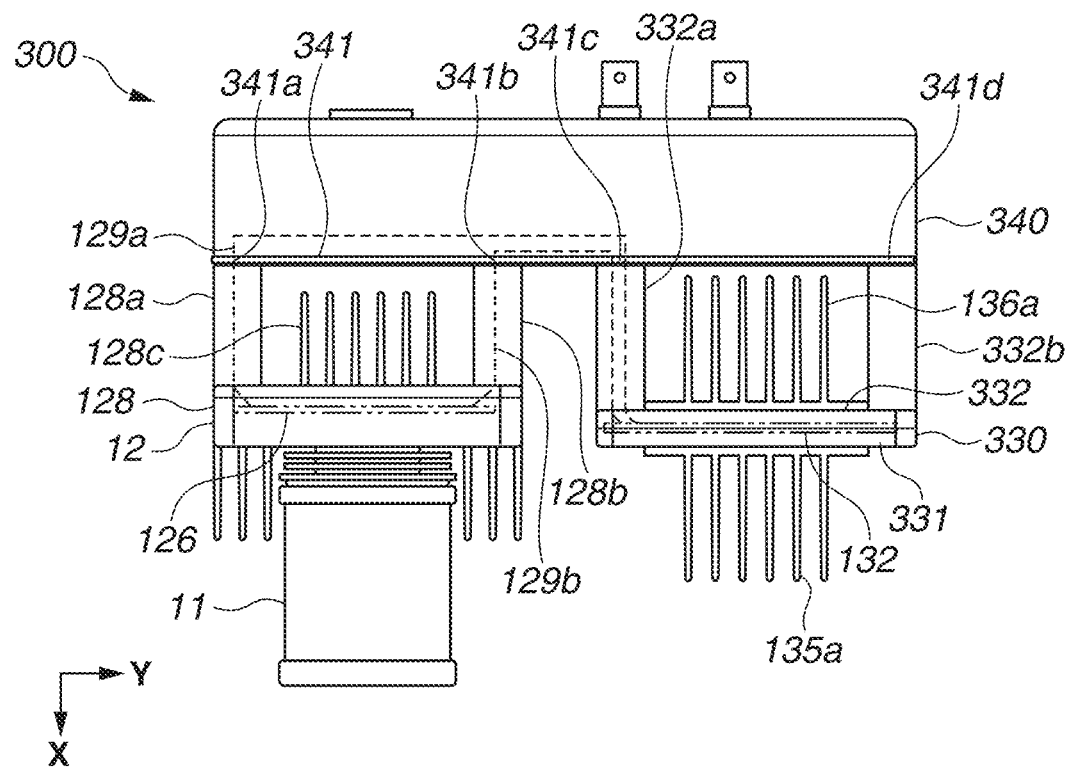
FIG. 8 illustrates a top surface of a camera according to a second exemplary embodiment.

FIG. 8 illustrates atop surface of a camera 300 according to the present exemplary embodiment. FIG. 8 will be described, omitting the descriptions of components similar to those in FIG. 4 of the first exemplary embodiment.

FIG. 8 illustrates the main unit 330, a front cover 331, a back cover 332, the interface unit 340, and a heat insulation plate 341. The camera 300 is mounted with the top surface of the camera 300 (Z-axis positive direction and front side of the paper) facing in the moving direction D of the train 5 similarly to FIGS. 5A and 5B. The wind F flows from the top surface side (Z-axis positive direction and front side of the paper) to the bottom surface side (Z-axis negative direction and back side of the paper) of the camera 300 while the train 5 is running.

The main unit 330 includes the main substrate 132 (portion illustrated with a long dashed double-dotted line) and the not-illustrated heat transfer members 133 and 134 inside the main unit 330, and the front cover 331 and the back cover 332 are sealed in the longitudinal direction (X-axis direction) using screws (not illustrated). The heat dissipation fins 135a are provided on a surface of the front cover 331 on the lens side (surface in the X-axis positive direction) in a manner protruding in a direction perpendicular to the main substrate 132 while being exposed to outside the casing. The heat dissipation fins 136a are provided on a surface of the back cover 332 on an opposite side from the lens (surface in the X-axis negative direction) in a manner protruding in a direction perpendicular to the main substrate 132 while being exposed to outside the casing. Arm portions 332a and 332b are provided on the exterior sides of the heat dissipation fins 136a of the back cover 332 in the Y-axis positive and negative directions, and are arranged so as not to block the flow of the wind F flowing into the heat dissipation fins 136a. The sensor unit 12 and the main unit 330 are arranged side by side in the Y-axis direction, and the arm portions 128a and 128b of the sensor unit 12 and the arm portions 332a and 332b of the main unit 330 are fixed to the interface unit 340 via the heat insulation plate 341 using screws (not illustrated). The camera 300 is configured to prevent the heat of the sensor unit 12 and the main unit 330 from being transferred to each other due to the intervention of the heat insulation plate 341 therebetween.

Next, the connection wires 129a and 129b, which electrically connect the sensor substrate 126 and the main substrate 132 to each other, will be described. In FIG. 8, portions illustrated with dotted lines indicate the connection wires 129a and 129b, and portions illustrated with long dashed double-dotted lines indicate the sensor substrate 126 and the main substrate 132. As illustrated in FIG. 8, the connection wire 129a is connected to the connector 126a (not illustrated) mounted on the back surface of the sensor substrate 126, passes through inside the arm portion 128a of the heat sink cover 128, is inserted through a hole portion 341a of the heat insulation plate 341, and then enters the interface unit 340. Further, the connection wire 129a is inserted from the interface unit 340 through a hole portion 341c of the heat insulation plate 341, passes through inside the arm portion 332a of the back cover 332, and is then connected to the connector 132c (not illustrated) mounted on the main substrate 132. Similarly, the connection wire 129b is connected to the connector 126b (not illustrated) mounted on the back surface of the sensor substrate 126, passes through inside the arm portion 128b of the heat sink cover 128, is inserted through a hole portion 341b of the heat insulation plate 341, and then enters the interface unit 340. Further, the connection wire 129b is inserted from the interface unit 340 through the hole portion 341c of the heat insulation plate 341, passes through inside the arm portion 332a of the back cover 332, and is then connected to the connector 132b (not illustrated) mounted on the main substrate 132. An external interface provided in the interface unit 340 is electrically connected to the main substrate 132 with a connection wire inserted through inside the arm portion 332b of the back cover 332.

As described above, the second exemplary embodiment can provide a camera not impairing the maintainability and small in size, and also capable of capturing the image without leading to the deterioration of the image quality, similar to the first exemplary embodiment. In addition, the present exemplary embodiment can further shorten the structure in the vertical direction (X-axis direction) compared to the first exemplary embodiment, thereby being effective, for example, when the moving object such as the train 5 and the imaging target are located close to each other and limited space is available.

In the following description, a third exemplary embodiment will be described with reference to the drawings. The third exemplary embodiment is different from the first exemplary embodiment and the second exemplary embodiment in terms of the layout of the sensor unit 12, a main unit 430, and an interface unit 440.

Figure 9:
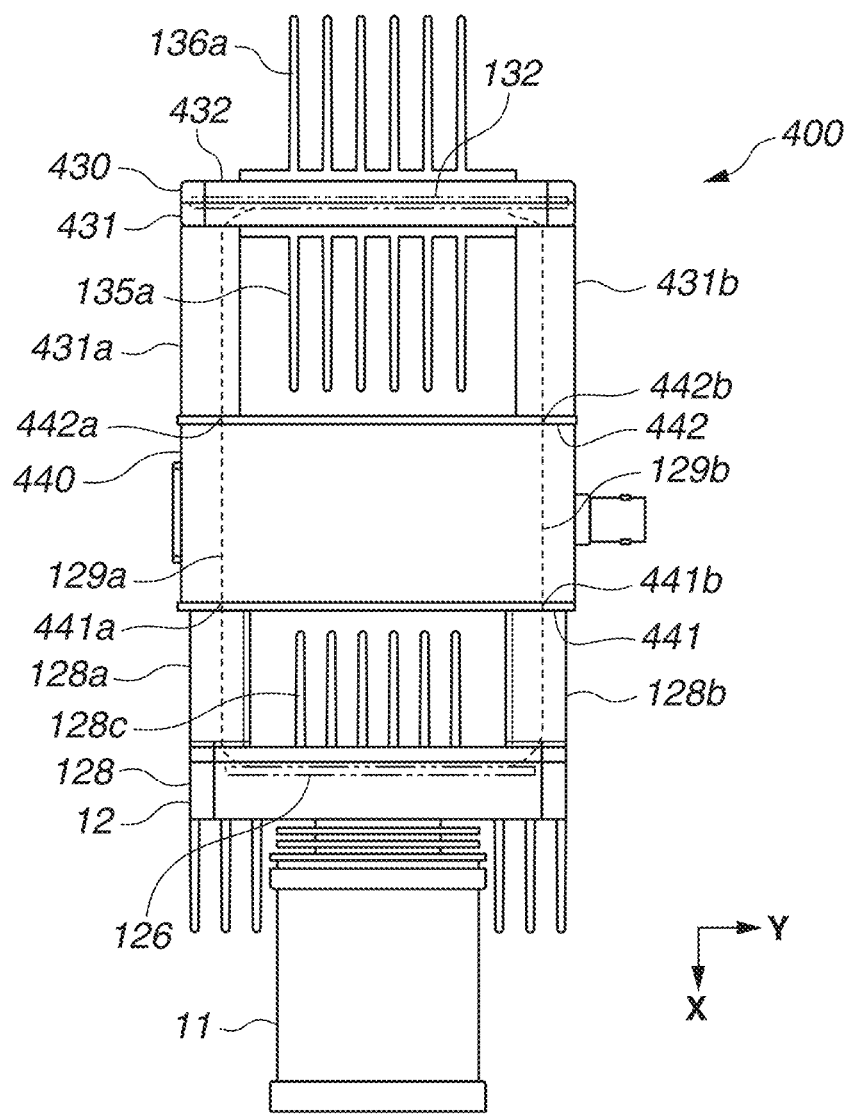
FIG. 9 illustrates a top surface of a camera according to a third exemplary embodiment.

FIG. 9 illustrates atop surface of a camera 400 according to the present exemplary embodiment. FIG. 9 will be described, omitting the descriptions of components similar to those in FIG. 4 of the first exemplary embodiment.

In FIG. 9, the interface unit 440 is disposed between the sensor unit 12 and the main unit 430. FIG. 9 illustrates a front cover 431 of the main unit 430 and a back cover 432 of the main unit 430. The front cover 431 and the back cover 432 are sealed in the longitudinal direction (X-axis direction) using screws (not illustrated). Further, FIG. 9 illustrates a front-side heat insulation plate 441 and a back-side heat insulation plate 442. The camera 400 is mounted with the top surface of the camera 400 (Z-axis positive direction and the front side of the paper) facing in the moving direction D of the train 5 similar to FIGS. 5A and 5B. The wind F flows from the top surface side (Z-axis positive direction and front side of the paper) to the bottom surface side (Z-axis negative direction and back side of the paper) of the camera 400 while the train 5 is running. The heat dissipation fins 135a are provided on a surface of the front cover 431 on the lens side (surface in the X-axis positive direction) in a manner protruding in a direction perpendicular to the main substrate 132 while being exposed to outside the casing. The heat dissipation fins 136a are provided on a surface of the back cover 432 on an opposite side of the lens (surface in the X-axis negative direction) in a manner protruding in a direction perpendicular to the main substrate 132 while being exposed to outside the casing. Arm portions 431a and 431b are provided on the exterior sides of the heat dissipation fins 135a of the front cover 431 in the Y-axis positive and negative directions, and are arranged so as not to block the flow of the wind F flowing into the heat dissipation fins 135a. Further, the arm portions 128a and 128b of the sensor unit 12 and the interface unit 440 are fixed to each other via the front-side heat insulation plate 441 using screws (not illustrated). The arm portions 431a and 431b of the front cover 431 are fixed to the interface unit 440 via the back-side heat insulation plate 442 using screws (not illustrated). The camera 400 is configured to prevent the heat of the sensor unit 12 and the main unit 430 from being transferred to each other due to the intervention of the front-side heat insulation plate 441 and the back-side heat insulation plate 442 therebetween and the arrangement of the interface unit 440 between the sensor unit 12 and the main unit 430.

Next, the connection wires 129a and 129b, which electrically connect the sensor substrate 126 and the main substrate 132 to each other, will be described with reference to FIG. 9. In FIG. 9, portions illustrated with dotted lines indicate the connection wires 129a and 129b, and portions illustrated with long dashed double-dotted lines indicate the sensor substrate 126 and the main substrate 132. As illustrated in FIG. 9, the connection wire 129a is connected to the connector 126a (not illustrated) mounted on the back surface of the sensor substrate 126, passes through inside the arm portion 128a of the heat sink cover 128, is inserted through a hole portion 441a of the front-side heat insulation plate 441, and then enters the interface unit 440. Further, the connection wire 129a is inserted from the interface unit 440 through a hole portion 442a of the back-side heat insulation plate 442, passes through inside the arm portion 431a of the front cover 431, and is then connected to the connector 132c (not illustrated) mounted on the main substrate 132. Similarly, the connection wire 129b is connected to the connector 126b (not illustrated) mounted on the back surface of the sensor substrate 126, passes through inside the arm portion 128b of the heat sink cover 128, is inserted through a hole portion 441b of the front-side heat insulation plate 441, and then enters the interface unit 440. Further, the connection wire 129b is inserted from the interface unit 440 through a hole portion 442b of the back-side heat insulation plate 442, passes through inside the arm portion 431b of the front cover 431, and is then connected to the connector 132b (not illustrated) mounted on the main substrate 132. An external interface provided in the interface unit 440 is electrically connected to the main substrate 132 with a connection wire inserted through inside the arm portion(s) 431a and/or 431b of the front cover 431.

As described above, the third exemplary embodiment can provide a camera not impairing the maintainability and small in size, and also capable of capturing the image without leading to the deterioration of the image quality, similar to the first exemplary embodiment. Further, the present exemplary embodiment allows the external interface to be disposed on the side surface of the camera 400 (Y-axis direction) by laying out the sensor unit 12, the main unit 430, and the interface unit 440 in the above-described manner. This layout allows the camera 400 to be set up without complicating the handling of the connection cable of the external interface, for example, when the camera 400 is mounted on a side surface of the train 5, compared to the first exemplary embodiment.

In the following description, a fourth exemplary embodiment will be described with reference to the drawings. The fourth exemplary embodiment is different from the first exemplary embodiment, the second exemplary embodiment, and the third exemplary embodiment in terms of the layout of the sensor unit 12, a main unit 530, and an interface unit 540.

Figure 10:
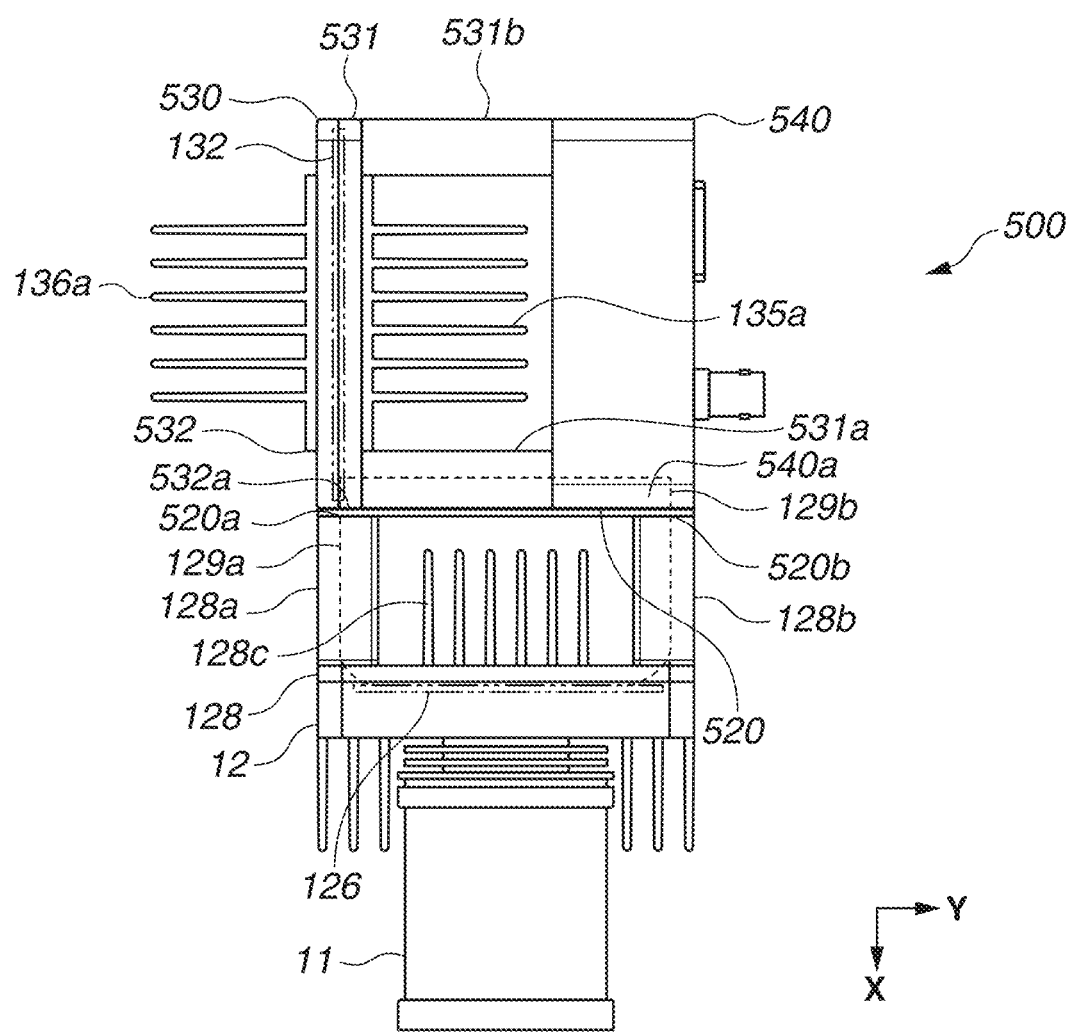
FIG. 10 illustrates a top surface of a camera according to a fourth exemplary embodiment.

FIG. 10 illustrates a top surface of a camera 500 according to the present exemplary embodiment. FIG. 10 will be described, omitting the descriptions of components similar to those in FIG. 4 of the first exemplary embodiment.

FIG. 10 illustrates how the main unit 530 and the interface unit 540 are disposed so as to be arranged perpendicularly to each other on the back surface side of the sensor unit 12 (X-axis negative direction side). FIG. 10 illustrates a right cover 531 of the main unit 530 and a left cover 532 of the main unit 530. The right cover 531 and the left cover 532 are sealed in the lateral direction (Y-axis direction) using screws (not illustrated). Further, FIG. 10 also illustrates a heat insulation plate 520. The camera 500 is mounted with the top surface of the camera 500 (Z-axis positive direction and the front side of the paper) facing in the moving direction D of the train 5 similar to that in FIGS. 5A and 5B. The wind F flows from the top surface side (Z-axis positive direction and the front side of the paper) to the bottom surface side (Z-axis negative direction and the back side of the paper) of the camera 500 while the train 5 is running. The heat dissipation fins 135a are provided on a surface of the right cover 531 on the right side (surface in the Y-axis positive direction) in a manner protruding in a direction perpendicular to the main substrate 132 while being exposed to outside the casing. The heat dissipation fins 136a are provided on a surface of the left cover 532 on the left side (surface in the Y-axis negative direction) in a manner protruding in a direction perpendicular to the main substrate 132 while being exposed to outside the casing. Arm portions 531a and 531b are provided on the exterior sides of the heat dissipation fins 135a of the right cover 531 in the X-axis positive and negative directions, and are arranged so as not to block the flow of the wind F flowing into the heat dissipation fins 135a. The arm portions 531a and 531b are fixed to the interface unit 540 using not-illustrated screws, and an external interface provided in the interface unit 540 is electrically connected to the main substrate 132 with a connection wire (not illustrated) inserted through inside the arm portion 531b of the right cover 531.

The arm portions 128a and 128b of the sensor unit 12 are fixed to the heat insulation plate 520 using not-illustrated screws. The heat insulation plate 520 is connected to the right cover 531 of the main unit 530 and the interface unit 540, and is fixed using screws (not illustrated). A hole portion 532a is formed on the right cover 531 connected to the heat insulation plate 520, and the connection wire 129a, which will be described below, is inserted therethrough. Further, a hole portion 540a is also formed on the interface unit 540 connected to the heat insulation plate 520, and the connection wire 129b is inserted therethrough. The camera 500 is configured to prevent the heat of the sensor unit 12 and the main unit 530 from being transferred to each other because of the connection between the sensor unit 12 and the main unit 530 via the heat insulation plate 520.

Next, the connection wires 129a and 129b, which electrically connect the sensor substrate 126 and the main substrate 132 to each other, will be described with reference to FIG. 10. In FIG. 10, portions illustrated with dotted lines indicate the connection wires 129a and 129b, and portions illustrated with long dashed double-dotted lines indicate the sensor substrate 126 and the main substrate 132. As illustrated in FIG. 10, the connection wire 129a is connected to the connector 126a (not illustrated) mounted on the back surface of the sensor substrate 126, passes through inside the arm portion 128a of the heat sink cover 128, and is then inserted through a hole portion 520a of the heat insulation plate 520. Further, the connection wire 129a is inserted through the hole portion 532a of the right cover 531, and is then connected to the connector 132c (not illustrated)

mounted on the main substrate 132. Similarly, the connection wire 129b is connected to the connector 126b (not illustrated) mounted on the back surface of the sensor substrate 126, passes through inside the arm portion 128b of the heat sink cover 128, and is then inserted through a hole portion 520b of the heat insulation plate 520. Further, the connection wire 129b is inserted through the hole portion 540a of the interface unit 540, passes through inside the arm portion 531a of the right cover 531, and is then connected to the connector 132b (not illustrated) mounted on the main substrate 132.

As described above, the fourth exemplary embodiment can provide a camera not impairing the maintainability and small in size, and also capable of capturing the image without leading to the deterioration of the image quality, similar to the first exemplary embodiment. Further, the present exemplary embodiment allows the external interface to be disposed on the side surface of the camera 500 (Y-axis direction) by laying out the sensor unit 12, the main unit 530, and the interface unit 540 in the above-described manner. This layout allows the camera 500 to be set up without complicating the handling of the connection cable of the external interface, for example, when the camera 500 is mounted on a side surface of the train 5, compared to the first exemplary embodiment.

In the following description, a fifth exemplary embodiment will be described with reference to the drawings. The fifth exemplary embodiment is different from the first exemplary embodiment, the second exemplary embodiment, the third exemplary embodiment, and the fourth exemplary embodiment in terms of the layout of the sensor unit 12, a main unit 630, and an interface unit 640.

FIGS. 11A and 11B illustrate an outer appearance of a camera 600 according to the present exemplary embodiment. FIG. 11A illustrates a top view of the camera 600, and FIG. 11B illustrates a right side view of the camera 600. FIGS. 11A and 11B will be described, omitting the descriptions of components similar to those in FIG. 4 of the first exemplary embodiment.

As illustrated in FIGS. 11A and 11B, the sensor unit 12 and the main unit 630 are disposed so as to be arranged vertically (Z-axis direction), and the interface unit 640 is disposed on the back surface side (X-axis negative direction side). FIGS. 11A and 11B illustrate a heat insulation plate 620, a back cover 631 of the main unit 630, and a front cover 632 of the main unit 630. In the main unit 630, the front cover 632 and the back cover 631 are sealed in the longitudinal direction (X-axis direction) using screws (not illustrated). The sensor unit 12 and the main unit 630 are fixed to the interface unit 640 via the heat insulation plate 620.

The camera 600 is mounted with the top surface of the camera 600 (Z-axis positive direction side) facing in the moving direction D of the train 5 similar to FIGS. 5A and 5B, and the wind F flows from the top surface side (Z-axis positive direction side) to the bottom surface side (Z-axis negative direction side) of the camera 600 while the train 5 is running. The heat dissipation fins 136a are provided on a surface of the front cover 632 on the lens side (surface in the X-axis positive direction) in a manner protruding in a direction perpendicular to the main substrate 132 while being exposed to outside the casing. The heat dissipation fins 135a are provided on a surface of the back cover 631 on an opposite side of the lens (surface in the X-axis negative direction) in a manner protruding in a direction perpendicular to the main substrate 132 while being exposed to outside the casing. Arm portions 631a and 631b are provided on the exterior sides of the heat dissipation fins 135a of the back cover 631 in the Y-axis positive and negative directions, and are arranged so as not to block the flow of the wind F flowing into the heat dissipation fins 135a. The arm portions 631a and 631b are fixed to the interface unit 640 via the heat insulation plate 620 using not-illustrated screws. An external interface provided in the interface unit 640 is electrically connected to the main substrate 132 with a connection wire (not illustrated) inserted through inside the arm portion 631b of the back cover 631.

The arm portions 128a and 128b of the sensor unit 12 and the interface unit 640 are fixed to each other via the heat insulation plate 620 using screws (not illustrated). The camera 600 is configured to prevent the heat of the sensor unit 12 and the main unit 630 from being transferred to each other due to the arrangement of the sensor unit 12 and the main unit 630 via the heat insulation plate 620 and the interface unit 640.

Next, the connection wires 129a and 129b, which electrically connect the sensor substrate 126 and the main substrate 132 to each other, will be described with reference to FIGS. 11A and 11B. In FIGS. 11A and 11B, portions illustrated with dotted lines indicate the connection wires 129a and 129b, and portions illustrated with long dashed double-dotted lines indicate the sensor substrate 126 and the main substrate 132. As illustrated in FIGS. 11A and 11B, the connection wire 129a is connected to the connector 126a (not illustrated) mounted on the back surface of the sensor substrate 126, passes through inside the arm portion 128a of the heat sink cover 128, and is then inserted through a hole portion 620a of the heat insulation plate 620. Further, the connection wire 129a passes through inside the interface unit 640, is inserted through a hole portion 620c (not illustrated) of the heat insulation plate 620, passes through inside the arm portion 631a of the back cover 631, and is then connected to the connector 132c (not illustrated) mounted on the main substrate 132. Similarly, the connection wire 129b is connected to the connector 126b (not illustrated) mounted on the back surface of the sensor substrate 126, passes through inside the arm portion 128b of the heat sink cover 128, and is then inserted through a hole portion 620b of the heat insulation plate 620. Further, the connection wire 129b passes through inside the interface unit 640, is inserted through a hole portion 620d of the heat insulation plate 620, passes through inside the arm portion 631b of the back cover 631, and is then connected to the connector 132b (not illustrated) mounted on the main substrate 132.

As described above, the fifth exemplary embodiment can provide a camera not impairing the maintainability and small in size, and also capable of capturing the image without leading to the deterioration of the image quality, similar to the first exemplary embodiment. In addition, the present exemplary embodiment can further shorten the structure in the vertical direction (X-axis direction) compared to the first exemplary embodiment, thereby being effective, for example, when the moving object such as the train 5 and the imaging target are located close to each other and limited space is available.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-192826, filed Oct. 23, 2019, which is hereby incorporated by reference herein in its entirety.

What is claimed is:

1. An imaging apparatus mounted on a moving object and configured to capture an image while moving along a moving direction of the moving object, the imaging apparatus comprising:
   a sensor unit including a sensor substrate on which an image sensor is mounted;
   a main unit including a main substrate on which an electronic component configured to process an output signal from the sensor substrate is mounted;
   a heat sink cover on which a component of the sensor unit is disposed;
   a pair of arm portions on the heat sink cover; and
   a heat dissipation fin configured to dissipate heat generated in at least one of the sensor unit and the main unit,
   wherein the heat dissipation fin is provided between the pair of arm portions and in a direction substantially parallel to the moving direction, and`
   wherein the sensor substrate and the main substrate are connected to each other by at least a connection wire passing through inside the arm portions.

2. The imaging apparatus according to claim 1, wherein the imaging apparatus does not include a fan for heat dissipation.

3. The imaging apparatus according to claim 1, wherein a direction of the image capturing by the image sensor extends substantially perpendicularly to the moving direction.

4. The imaging apparatus according to claim 3, further comprising an optical system,
   wherein a direction of an optical axis of the optical system extends substantially perpendicularly to the moving direction.

5. The imaging apparatus according to claim 4, wherein the heat dissipation fin is provided around a lens.

6. The imaging apparatus according to claim 1, further comprising an interface unit including an external interface.

7. The imaging apparatus according to claim 1, wherein the heat dissipation fin is provided in contact with at least one of the sensor unit and the main unit.

8. The imaging apparatus according to claim 1, wherein the heat dissipation fin includes a plurality of fin portions provided at an equal interval.

9. The imaging apparatus according to claim 1, wherein at least a part of the heat dissipation fin is provided so as to extend in a direction substantially perpendicular to the sensor substrate.

10. The imaging apparatus according to claim 1, wherein the heat dissipation fin is provided so as to be exposed to an outside.

11. The imaging apparatus according to claim 1, wherein the main unit detects a state of a detection target using the output signal from the sensor unit.

12. The imaging apparatus according to claim 11, further comprising a memory configured to store predetermined data in advance,
   wherein the main unit detects the state of the detection target by comparing the predetermined data stored in the memory and the output signal from the sensor unit.

13. The imaging apparatus according to claim 1, wherein the moving object is a vehicle moving along a track, and the imaging apparatus images the track.

14. The imaging apparatus according to claim 13, wherein the moving object is a railway vehicle, and the imaging apparatus images a rail provided on the track along which the railway vehicle runs.

15. The imaging apparatus according to claim 1, wherein the heat dissipation fin is a pin-type or rib-shaped member.

16. The imaging apparatus according to claim 1, wherein two facing surfaces of the sensor unit and the main unit are made from materials having lower thermal conductivity than thermal conductivity of materials of the heat dissipation fin.

17. The imaging apparatus according to claim 1, wherein at least a part of the heat dissipation fin which is provided to dissipate heat generated in the main unit is provided so as to extend in a direction substantially perpendicular to the main substrate.

18. An imaging apparatus mounted on a moving object and configured to capture an image while moving along a moving direction of the moving object, the imaging apparatus comprising:
   a sensor unit including a sensor substrate on which an image sensor is mounted;
   a main unit including a main substrate on which an electronic component configured to process an output signal from the sensor substrate is mounted;
   a heat sink cover on which a component of the sensor unit is disposed;
   a pair of arm portions on the heat sink cover; and
   a heat dissipation unit configured to dissipate heat generated in at least one of the sensor unit and the main unit,
   wherein the heat dissipation unit is provided so as to cause an outside air to flow in a direction substantially parallel to the moving direction, and the heat dissipation unit is provided between the pair of arm portions, and
   wherein the sensor substrate and the main substrate are connected to each other by at least a connection wire passing through inside the arm portions.

19. An imaging apparatus comprising:
   an optical system including a lens;
   a sensor unit including a sensor substrate including an image sensor;
   a main unit including a main substrate;
   an interface unit including an external interface;
   a heat sink cover on which a component of the sensor unit is disposed; and
   a pair of arm portions on the heat sink cover and a heat dissipation fin between the pair of arm portions exposed to an outside and provided on a surface on an opposite side of the lens,
   wherein at least one of the arm portions is fixed to the main unit or the interface unit, and
   wherein a connection wire used to electrically connect the sensor unit and the main unit to each other is disposed inside the at least one of the arm portions.

20. A moving object on which an imaging apparatus is mounted, the imaging apparatus comprising:
   a sensor unit including a sensor substrate on which an image sensor is mounted;
   a main unit including a main substrate on which an electronic component configured to process an output signal from the sensor substrate is mounted;
   a heat sink cover on which a component of the sensor unit is disposed;
   a pair of arm portions on the heat sink cover; and
   a heat dissipation fin configured to dissipate heat generated in at least one of the sensor unit and the main unit, wherein the heat dissipation fin is provided in a direction substantially parallel to a moving direction of the moving object, and wherein the sensor substrate and the main substrate are connected to each other by at least a connection wire passing through inside the arm portions.

21. The moving object according to claim 20, wherein the moving object is a vehicle moving along a track, and the imaging apparatus images the track.

22. The moving object according to claim 21, wherein the moving object is a railway vehicle, and the imaging apparatus images a rail provided on the track along which the railway vehicle runs.

* * * * *